(12) United States Patent
Zuber

(10) Patent No.: US 9,883,773 B1
(45) Date of Patent: Feb. 6, 2018

(54) SPATULA WITH CHANNELS

(71) Applicant: Adam A. Zuber, Fort Myers, FL (US)

(72) Inventor: Adam A. Zuber, Fort Myers, FL (US)

(*) Notice: Subject to any disclaimer, the term of this patent is extended or adjusted under 35 U.S.C. 154(b) by 0 days.

(21) Appl. No.: 15/594,935

(22) Filed: May 15, 2017

(51) Int. Cl.
*A47J 43/28* (2006.01)
*A47J 43/18* (2006.01)
*A47J 43/07* (2006.01)

(52) U.S. Cl.
CPC .......... *A47J 43/288* (2013.01); *A47J 43/28* (2013.01); *A47J 43/283* (2013.01); *A47J 43/07* (2013.01); *A47J 43/18* (2013.01)

(58) Field of Classification Search
CPC ........ A47J 43/28; A47J 43/283; A47J 43/288; A47J 43/07; A47J 43/18; A47L 17/06
USPC ...................... 294/7, 8; 15/236.05
See application file for complete search history.

(56) References Cited

U.S. PATENT DOCUMENTS

| | | | |
|---|---|---|---|
| 1,353,307 A * | 9/1920 | Berger | A47J 43/288 294/49 |
| 2,294,096 A | 7/1941 | Rice | |
| 2,567,091 A | 9/1951 | Whitnah et al. | |
| 3,753,587 A | 8/1973 | Godlewski | |
| 3,758,143 A * | 9/1973 | Godlewski | A47J 43/288 294/8 |
| 3,877,143 A * | 4/1975 | Montesi | A47G 21/045 294/7 |
| 4,205,870 A * | 6/1980 | Conner | A47J 43/283 294/7 |
| 4,848,816 A * | 7/1989 | Anderson | A47J 43/288 15/236.08 |
| 5,403,052 A | 4/1995 | Lampron | |
| 5,875,515 A * | 3/1999 | Dallas | A47J 43/288 15/236.01 |
| 5,934,722 A | 8/1999 | Evans | |
| 6,024,391 A * | 2/2000 | Horn | A47J 36/36 294/7 |
| D712,710 S | 9/2014 | Gonzales | |
| D571,353 S | 3/2016 | Rose | |
| 2011/0191974 A1* | 8/2011 | Holcomb | A47J 43/281 152/236.01 |

FOREIGN PATENT DOCUMENTS

| | | | | |
|---|---|---|---|---|
| FR | 2682026 A1 * | 4/1993 | | A47J 43/288 |
| GB | 954117 | * | 4/1964 | |

OTHER PUBLICATIONS

Prepworks Chop Turner Internet Printout.

* cited by examiner

*Primary Examiner* — Dean J Kramer
(74) *Attorney, Agent, or Firm* — Edward M. Livingston, Esq.; Bryan L. Loeffler, Esq.; Livingston Loeffler, P.A.

(57) ABSTRACT

A spatula (1) having a head (5) with channels (11) that automatically turn or flip food, such as cubed meats, ground beef, vegetables and so forth, when the food travels through the channels. As the head passes through the pieces of food, the pieces of food are forced through the C-shaped channels or grooves located on the opposing side surfaces (8) of the head. The channels are preferably curved having an opening (12) located proximate to a wedge (15) of the head, then extending over a rounded projection (13) and terminating at a rear wall (14) of the head where the food is forced to exit the channels.

12 Claims, 3 Drawing Sheets

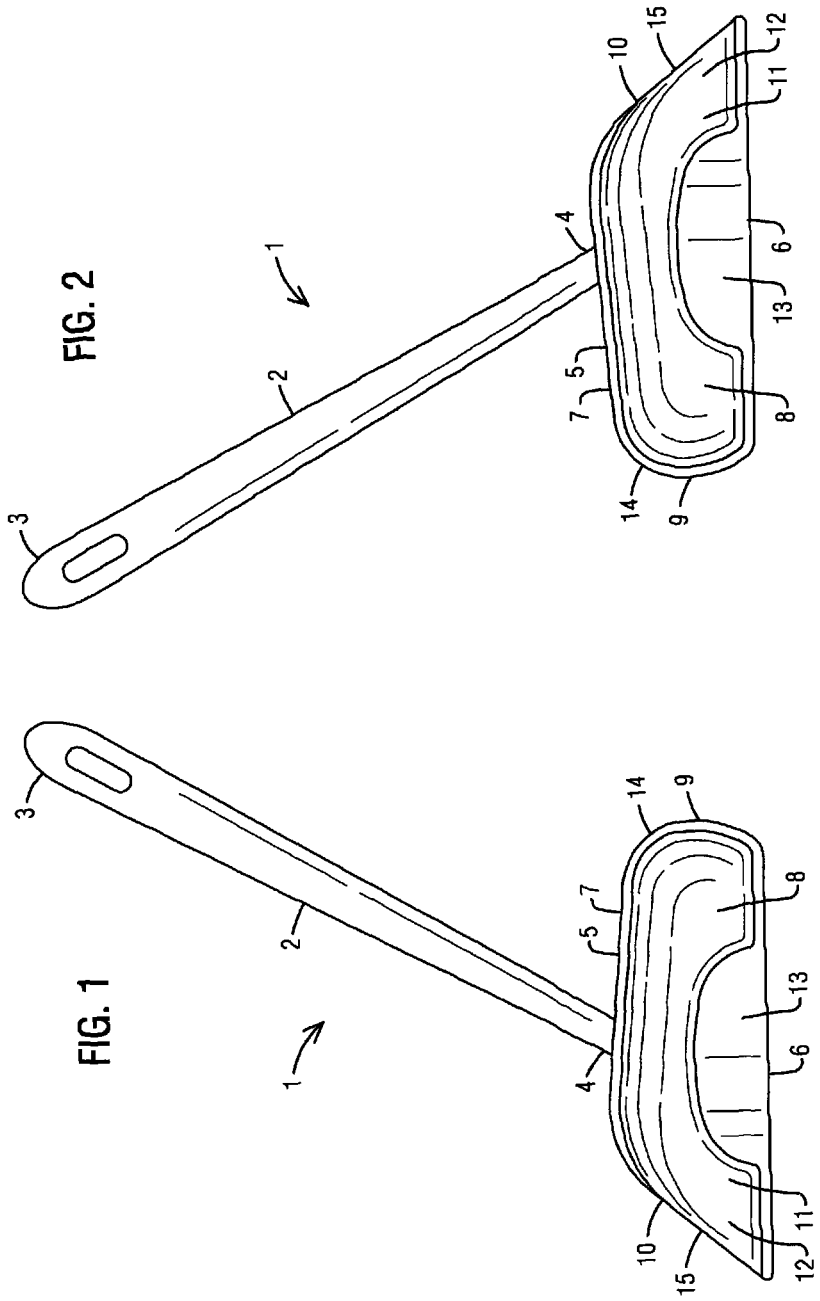

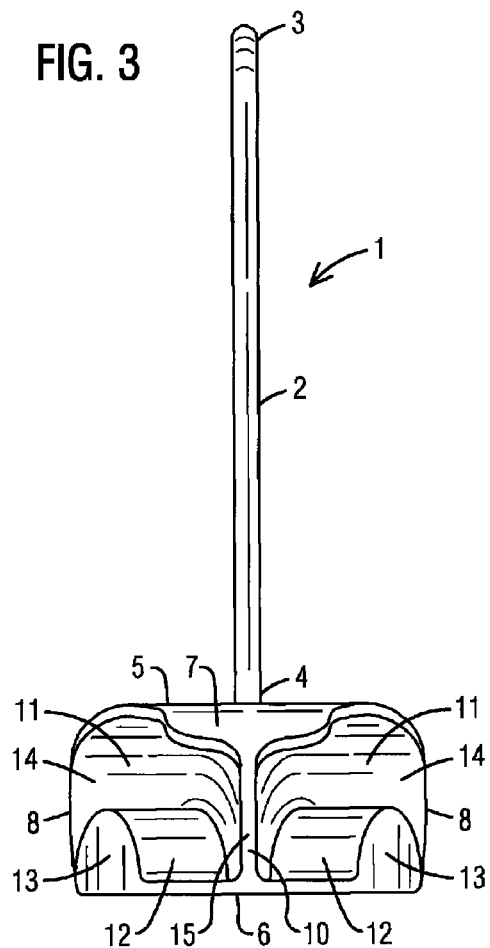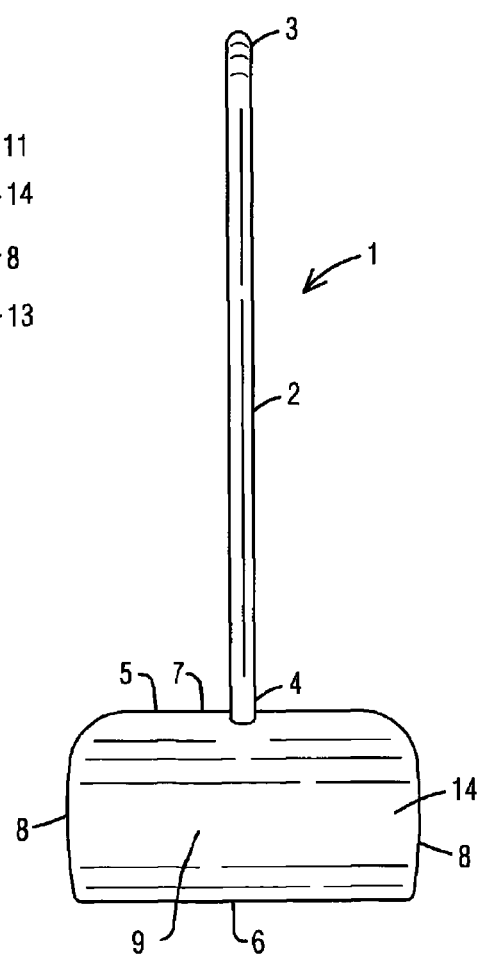

SPATULA WITH CHANNELS

FIELD OF THE INVENTION

This invention relates to cooking utensils used for cooking meat and other food in a pan and more particularly a spatula having a triangular-shaped head with channels on each side that allow a user to turn multiple pieces of food quickly and efficiently by passing the head of the spatula through the pieces of food, thereby forcing the pieces of food through the channels, thereby causing the pieces of food to rotate.

BACKGROUND OF THE INVENTION

Many recipes call for foods, such as chicken, beef or pork, to be cut into small pieces or cubed and then sautéed in a pan. The pieces of food are normally placed into the pan and then each piece must be turned individually using a spatula, wooden spoon, tongs or other utensil to ensure each piece of food is cooked evenly on all sides. This can be a tedious task as the pieces of food are normally crowded in the pan and can be difficult to turn individually using conventional utensils. This can also lead to uneven cooking as some pieces of meat may not be turned quickly enough. This problem also applies to vegetables or other types of food being cooked in a pan.

Therefore, a need exists for a spatula that allows a user to flip multiple pieces of food in a pan at the same time.

SUMMARY OF THE INVENTION

The primary object of the present invention is to provide a spatula that allows a user to flip multiple pieces of food in a pan at the same time.

The present invention fulfills the above and other objects by providing a spatula having a triangular-shaped head with a wedge located on the front of the head. The wedge allows the head to pass through multiple pieces of food that are grouped together in a pan. As the head passes through the pieces of food, the pieces of food are forced through substantially C-shaped channels located on opposing sides of the head. The channels are preferably curved having an opening located proximate to the wedge of the head, then extending over a rounded projection and terminating at a rear wall of the head where the food is forced to exit the channels. As the food travels over the rounded projections it is forced to flip over outward from the channels as it is forced out of the channels by the rear wall.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is right side view of a spatula of the present invention;

FIG. 2 is left side view of a spatula of the present invention;

FIG. 3 is front view of a spatula of the present invention;

FIG. 4 is rear view of a spatula of the present invention;

DESCRIPTION OF THE PREFERRED EMBODIMENTS

Figure 5:
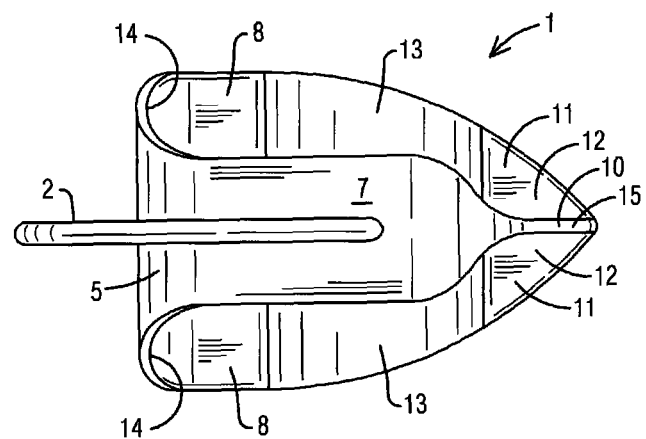
FIG. 5 is top view of a spatula of the present invention.
Figure 6:
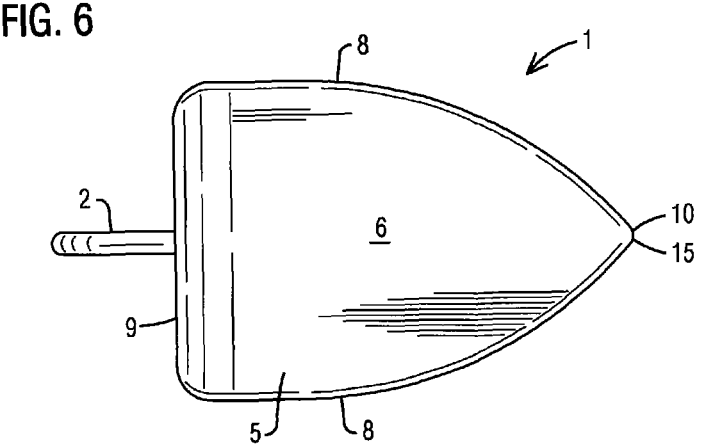
FIG. 6 is bottom view of a spatula of the present invention.

For purposes of describing the preferred embodiment, the terminology used in reference to the numbered accessories in the drawings is as follows:
1. spatula, generally
2. elongated handle
3. proximal end of handle
4. distal end of handle
5. head
6. bottom surface of head
7. top surface of head
8. side surface of head
9. rear surface of head
10. front surface of head
11. channel
12. channel opening
13. projection
14. rear wall of head
15. wedge With reference to FIGS. 1-6, a spatula 1 of the present invention is illustrated. The spatula 1 of the present invention comprises an elongated handle 2 having a proximal end 3 and a distal end 4. A head 5 is located on the distal end 4 of the elongated handle 2. The head 5 comprises a bottom surface 6, a top surface 7, side surfaces 8, a rear surface 9 and a front surface 10. A wedge 15 is located on said front surface 10 formed by a triangular-shaped bottom surface 6 and top surface 7. The wedge 15 allows the head 5 to pass through multiple pieces of food that are grouped together in a pan. As the head 5 passes through the pieces of food, the pieces of food are forced through substantially C-shaped channels 11 or grooves located on the opposing side surfaces 8 of the head 5. The channels 11 are preferably curved having an opening 12 located proximate to the wedge 15 of the head 5, then extending over a rounded projection 13 and terminating at a rear wall 14 of the head 5 where the food is forced to exit the channels 11. As the food travels over the rounded projections 13 of each channel 11, it is forced to flip over outward from the side surfaces 8 forming the channels 11 as pieces of food make contact with the rear wall 14.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:
1. A spatula for use with preparing food comprising:
   a handle having a proximal end and a distal end;
   a head located on the distal end of the handle;
   said head having substantially C-shaped channels located on opposing sides of the head; and
   a rounded projection located within each of the substantially C-shaped channels.
2. The spatula of claim 1 further comprising:
   a wedge located on a front surface of the head.

3. The spatula of claim 1 further comprising:
each of the substantially C-shaped channels curving over each of the rounded projections located therein.
4. The spatula of claim 1 further comprising:
a rear wall located on the head.
5. A spatula for use with preparing food comprising:
a handle having a proximal end and a distal end;
a head located on the distal end of the handle;
said head having a bottom surface, a top surface, side surfaces, a rear surface and a front surface;
a wedge located on the front surface of the head;
said head having a substantially C-shaped channel located on each of the side surfaces of the head; and
said wedge is formed by a triangular shape of the bottom surface.
6. Said spatula of claim 5 further comprising:
at least one rounded projection located within each of the substantially C-shaped channels.
7. Said spatula of claim 5 further comprising:
a rear wall located on the head.
8. Said spatula of claim 5 wherein:
said wedge is formed by a triangular shape of the top surface.
9. A spatula for use with preparing food comprising:
a handle having a proximal end and a distal end;
a head located on the distal end of the handle;
said head having a bottom surface, a top surface, side surfaces, a rear surface and a front surface;
a wedge located on the front surface of the head;
said head having a substantially C-shaped channel located on each of the side surfaces of the head; and
at least one rounded projection located within each of the substantially C-shaped channels.
10. Said spatula of claim 9 further comprising:
a rear wall located on the head.
11. Said spatula of claim 9 wherein:
said wedge is formed by a triangular shape of the bottom surface.
12. Said spatula of claim 9 wherein:
said wedge is formed by a triangular shape of the top surface.

* * * * *